(12) United States Patent
Jolliff

(10) Patent No.: US 11,816,867 B2
(45) Date of Patent: Nov. 14, 2023

(54) CHROMATIC DOMAIN MAPPING

(71) Applicant: The Government of the United States of America, as represented by the Secretary of the Navy, Arlington, VA (US)

(72) Inventor: Jason K. Jolliff, Slidell, LA (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 203 days.

(21) Appl. No.: 17/176,988

(22) Filed: Feb. 16, 2021

(65) Prior Publication Data
US 2021/0272321 A1    Sep. 2, 2021

Related U.S. Application Data

(60) Provisional application No. 62/975,930, filed on Feb. 13, 2020.

(51) Int. Cl.
*B64G 1/10* (2006.01)
*G06T 7/90* (2017.01)
*H04N 9/67* (2023.01)

(52) U.S. Cl.
CPC .............. *G06T 7/90* (2017.01); *B64G 1/1021* (2013.01); *H04N 9/67* (2013.01); *B64G 2001/1028* (2013.01); *G06T 2207/10024* (2013.01); *G06T 2207/10032* (2013.01)

(58) Field of Classification Search
CPC ..................... B64G 1/1021; B64G 2001/1028; G06T 7/90; G06T 2207/10024; G06T 2207/10032; H04N 9/67
See application file for complete search history.

(56) References Cited

FOREIGN PATENT DOCUMENTS

| CN | 102063700 A | * | 5/2011 |
| CN | 102222238 A | * | 10/2011 |
| CN | 102982538 A | * | 3/2013 |
| CN | 103955896 A | * | 7/2014 |

OTHER PUBLICATIONS

Jolliff et al. ("Observing the Ocean Submesoscale with Enhanced-Color GOES-ABI Visible Band Data," Sensors (Basel). Sep. 2019; 19(18): 3900; Published online Sep. 10, 2019) (Year: 2019).*
Murata et al. ("True Color Imagery Rendering for Himawari-8 with a Color Reproduction Approach Based on the CIE XYZ Color System," J. Meteorological Society of Japan, vol. 96B, 2018) (Year: 2018).*

(Continued)

*Primary Examiner* — Yubin Hung
(74) *Attorney, Agent, or Firm* — US Naval Research Laboratory; Nigel R. Fontenot

(57) ABSTRACT

Systems and methods are provided for color-enhancing satellite data in a manner that is specific to the true color ocean signal, i.e., the light that is emanating from the ocean surface. These color enhanced images, in turn, can be used as a scientific research and monitoring tool for studying the coastal ocean.

20 Claims, 8 Drawing Sheets

(56) References Cited

OTHER PUBLICATIONS

Gladkova et al. ("Virtual green band for GOES-R," SPIE 8153, Earth Observing Systems XVI, 81531C; Sep. 13, 2011) (Year: 2011).*
Zheng ("An overview of night vision colorization techniques using multispectral images: From color fusion to color mapping," International Conference on Audio, Language and Image Processing; Date of Conference: Jul. 16-18, 2012) (Year: 2012).*
Patra et al. ("A technique for spectral pixel reconstruction," IEEE International Geoscience and Remote Sensing Symposium; Date of Conference: Jul. 24-29, 2011) (Year: 2011).*
Xu et al. ("A Technique for Simulating Pseudo Natural Color Images Based on Spectral Similarity Scales," IEEE Geoscience and Remote Sensing Letters (vol. 9, Issue: 1, Jan. 2012; Date of Publication: Aug. 1, 2011) (Year: 2011).*

* cited by examiner

CHROMATIC DOMAIN MAPPING

CROSS REFERENCE TO RELATED APPLICATIONS

This application claims the benefit of U.S. Provisional Patent Application No. 62/975,930 filed on Feb. 13, 2020, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, D.C. 20375, USA; +1.202.767.7230; techtran@nrl.navy.mil, referencing Navy Case Number 110827-US2.

FIELD OF THE DISCLOSURE

This disclosure relates to image processing, including colorizing images.

BACKGROUND

Satellites, such as the Geostationary Operational Environmental Satellite (GOES) series satellites are geostationary platforms that are used primarily to observe the atmosphere and aid meteorologists. The Advanced Baseline Imager (ABI) instrument on GOES East and West has 2 wide visible bands at 470 nm and 640 nm and provides incomplete information to determine the color signal emanating from the surface ocean. For example, GOES-R ABI lacks the signal sensitives normally used for ocean color remote sensing, and it also has no band in the green portion of the visible.

One technique to colorize these data (effectively add a green band) is to use an empirical look-up table based on other satellite data records. These tables are not specific to true color spaces and include land/atmosphere interference, i.e., they are not specific to the ocean surface.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
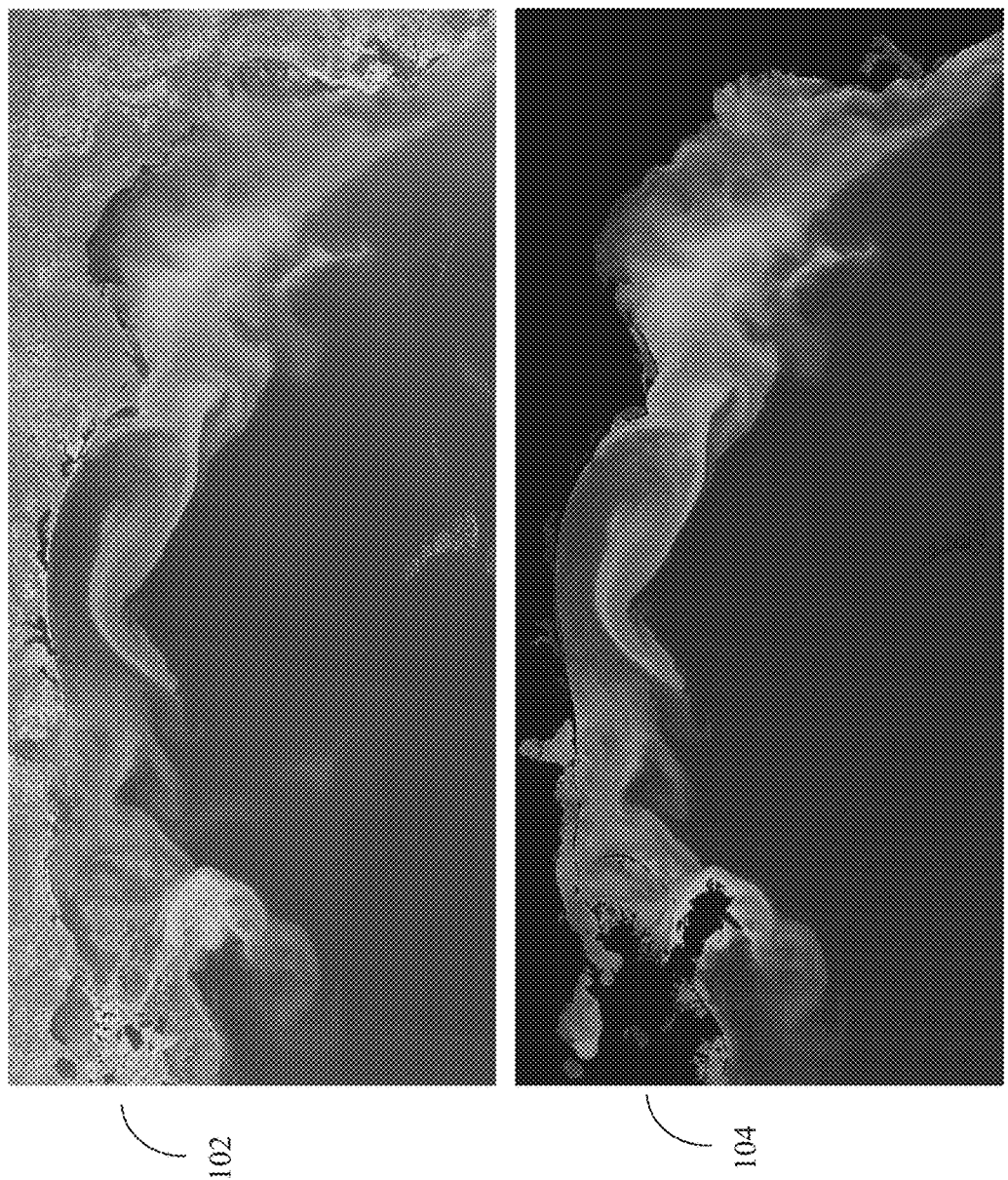
FIG. 1 shows Ocean and Land Color Imager (OLCI) true color reconstruction images in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

Embodiments of the present disclosure use data from dedicated ocean color sensors on polar-orbiting satellites to estimate the true color ocean signal in geostationary, meteorological satellites. Embodiments of the present disclosure provide systems and methods to color-enhance satellite data in a manner that is specific to the true color ocean signal, i.e., the light that is emanating from the ocean surface. These color enhanced images, in turn, can be used as a scientific research and monitoring tool for studying the coastal ocean.

Embodiments of the present disclosure apply a colorimetry analysis to ocean color satellite data to "map" the true color space as a frame-of-reference and parse the true color chromaticity space into brightness-independent increments before determining the brightness-dependent primary statistical relationships (X, Y, and Z). This technique avoids color discontinuities seen in other techniques.

Systems and methods in accordance with embodiments of the present disclosure permit the coastal ocean to be observed from space at 5-minute increments, allowing unprecedented temporal resolution for ocean satellite observation.

2. Chromatic Domain Mapping

In an embodiment, chromatic domain mapping systems and/or methods analyze a reference image to determine how the color tristimulus primaries (X, Y, and Z) are related to one another. Based on these relationships, a maximum likelihood estimate of the missing primary in a target image is determined.

In an embodiment, for oceanography purposes, the reference image is a true color image constructed from dedicated ocean color sensors. An example of true color reconstruction for the Ocean and Land Color Imager (OLCI) data are shown in FIG. 1. Specifically, FIG. 1 shows OLCI true color reconstruction images. The top image 102 shows true color based on top-of-atmosphere and Rayleigh-corrected reflectance, and the bottom image 104 shows true color based on atmospherically-corrected remotely-sensed reflectance (Rrs). Note: the dominant wavelength features of the color signal are not significantly impacted by aerosols.

GOES-ABI (East) has two broad bands in the visible, one centered at 470 nm and one at 640 nm. These data do not provide enough information to make a color image. In an embodiment, a Chromatic Domain Mapping (CDM) method can be used to quantify how the X, Y, and Z tristimulus primaries (or, alternatively, the x, y, and z chromaticity variables) are related to one another in a reference color image. This information can then be used to determine the most likely estimator of one primary in a target image where that primary is corrupt, incomplete, or missing. In an embodiment, this method is tractable for images based, primarily, on the ocean color signal, i.e., the water-leaving radiance.

In an embodiment, for the GOES-ABI data, it is presumed that the 470 band is a suitable and linear estimator of the blue primary, Z, and the 470 band and 640 band are (combined) likewise estimators of the red primary, X. In an embodiment, the Y primary is missing because, for example, GOES-ABI does not have a green band sensor. In an embodiment, given an estimate of X and Z, an estimate of Y is determined. To reduce variations due to changes in brightness (signal magnitude), it can be prudent to examine the behavior of a reference color image in chromaticity space. However, since, in an embodiment, the Y primary is unknown, the problem can be reduced further to examine the relationship between primary ratios.

Figure 2:
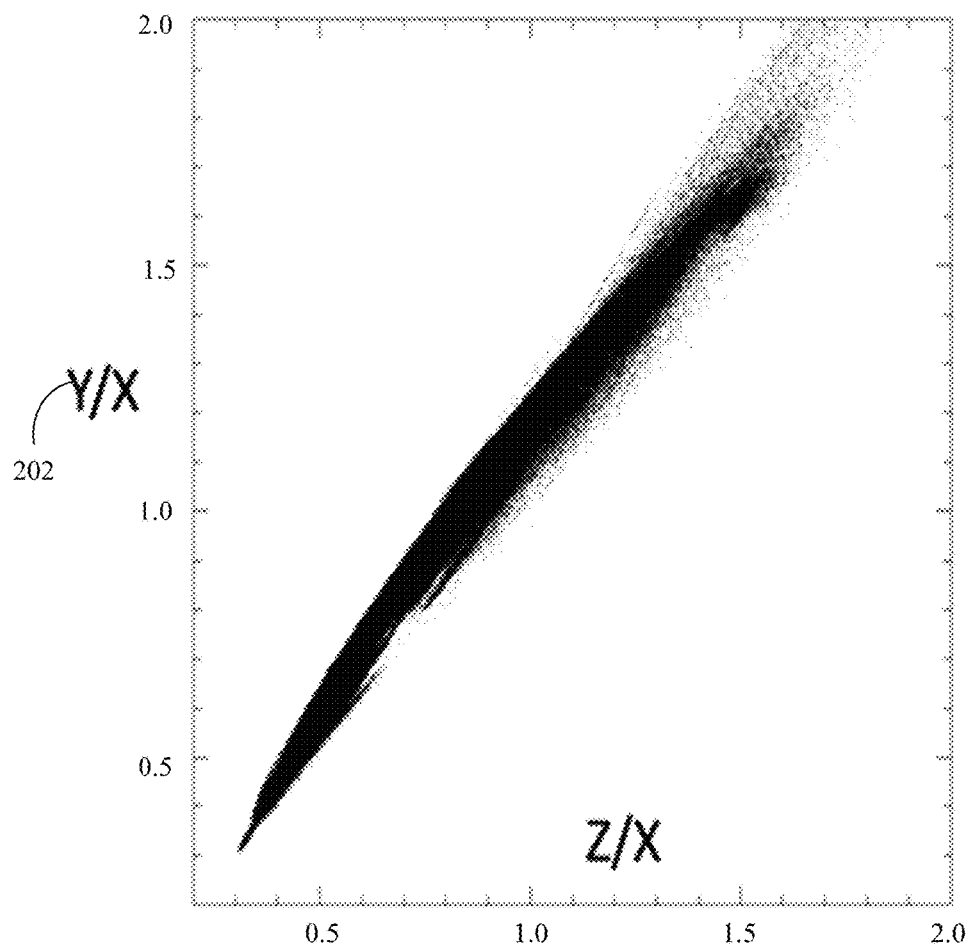
FIG. 2 shows plots of tristimulus primary data extracted from OLCI data in accordance with an embodiment of the present disclosure.
Figure 2:
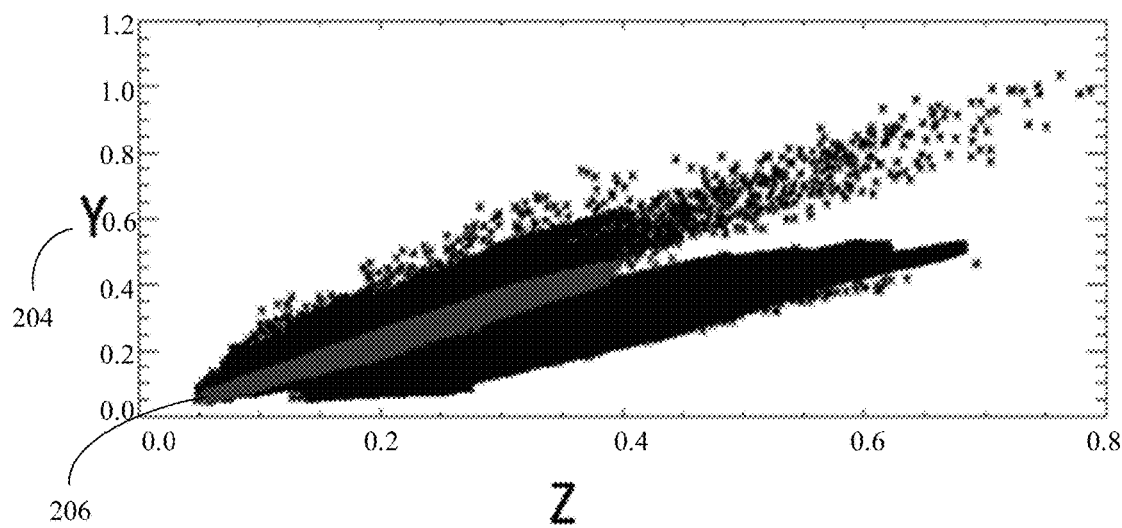

FIG. 2 shows plots of tristimulus primary data extracted from OLCI data in accordance with an embodiment of the present disclosure. The top image 202 shows a plot of primary ratios, and the bottom image 204 shows a plot of the Y versus Z primary. The differently shaded area 206 indicates a restricted range for the primary ratio Z/X.

In an embodiment, there is a quasi-linear relationship between Z/X (known) and Y/X (unknown). This relationship can be exploited by setting limits on the minimum/maximum value of Y for a given value of Z and X. In an embodiment, the variance between these bounds is the green-blue variance (Y/Z). In an embodiment, to determine the absolute magnitude of Y, we then examine the relationship between X and Y, and then Z and Y over a restricted range of Z/X values. In an embodiment, these primary magnitude relationships tend to be linear over a very restricted range of water optical types. In an embodiment, the Z/X ratio can be conceptualized as a bulk indicator of water turbidity ranging from clear waters (high blue to red ratio) to very turbid (very low blue to red ratio).

In an embodiment, chromatic domain mapping is the process of establishing these relationships in the reference image and then determining the most likely missing or corrupt primary on the target image. In theory, these relationships could be established from reference IOPs in marine waters for Rrs values. However, this can be complicated by a need to remove aerosol contamination from GOES blue and red band values. The reference image can then be the top-of-atmosphere reflectance, with land and clouds eliminated from the final image for CDM application.

Figure 3:
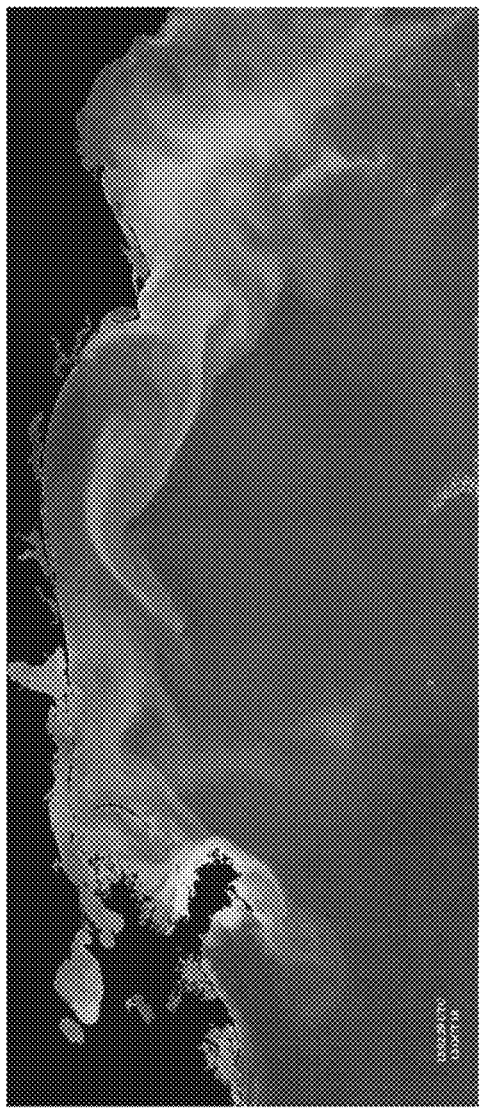
FIG. 3 shows GOES-ABI, CDM-enhanced images from a begin scene and end-scene for a 24 frame (15-minute interval) sequence in accordance with an embodiment of the present disclosure.
Figure 3:
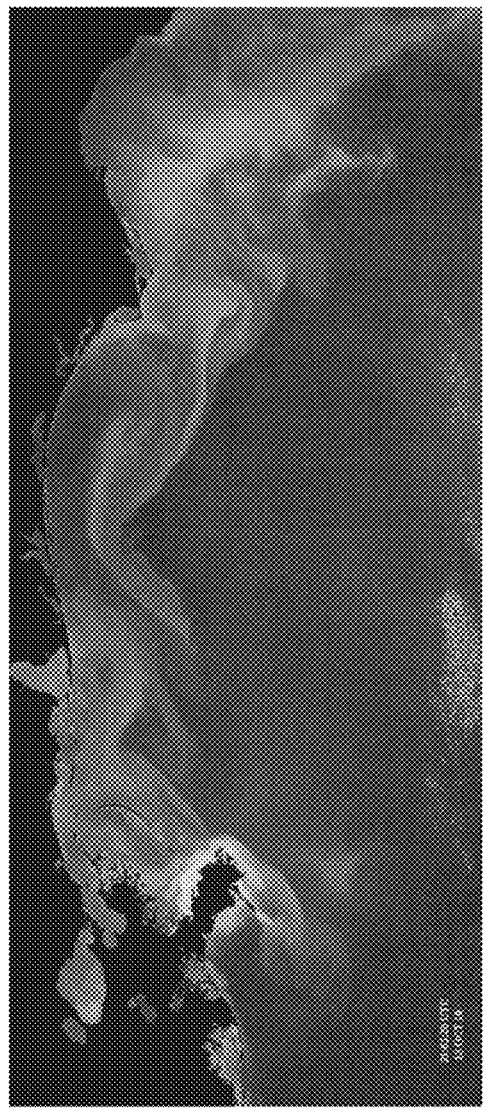

FIG. 3 shows GOES-ABI, CDM-enhanced images from a begin scene and end-scene for a 24 frame (15-minute interval) sequence in accordance with an embodiment of the present disclosure. The CDM-enhanced GOES-ABI image sequence of FIG. 3 faithfully reproduces the color detected in the OLCI reconstruction of FIG. 1.

3. Exemplary Systems

Figure 4:
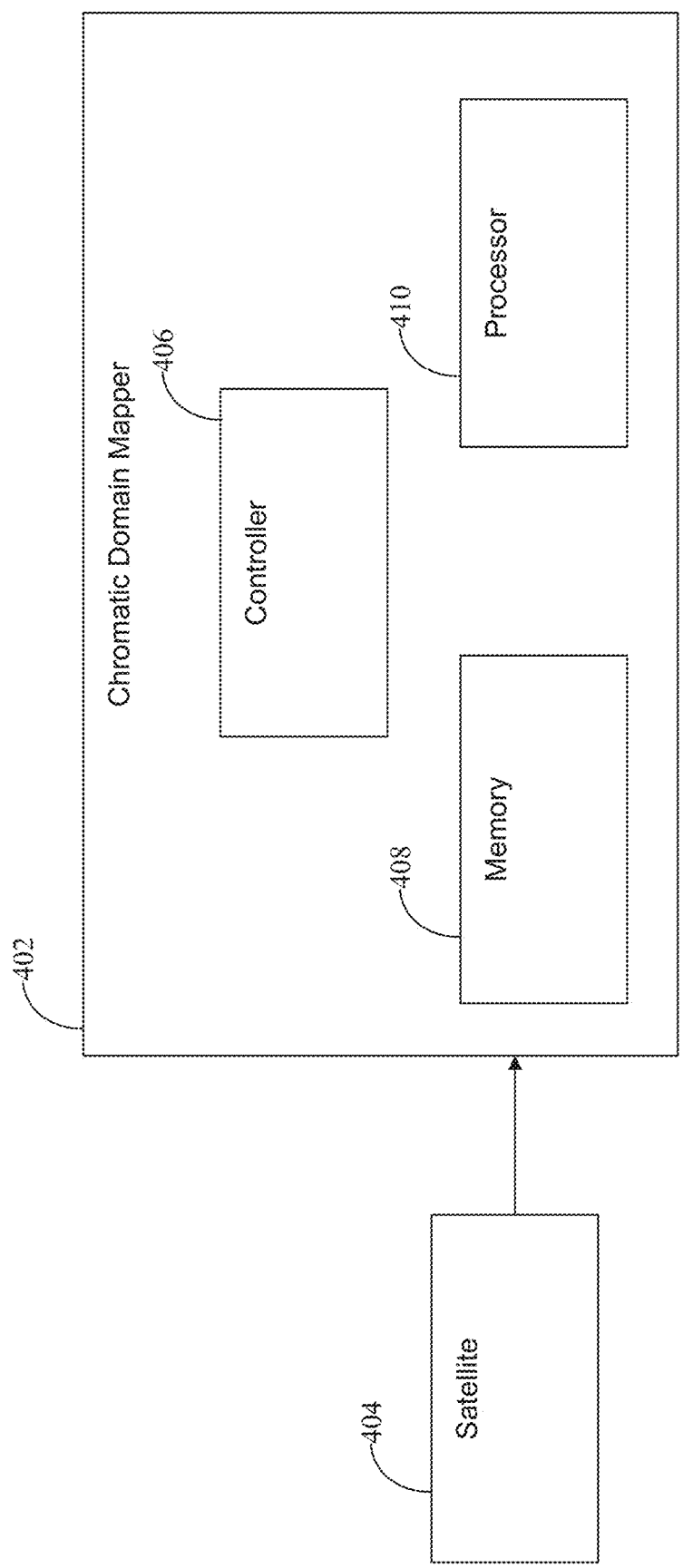
FIG. 4 is a diagram of an exemplary system for chromatic domain mapping in accordance with an embodiment of the present disclosure.

FIG. 4 is a diagram of an exemplary system for chromatic domain mapping in accordance with an embodiment of the present disclosure. In FIG. 4, a chromatic domain mapper 402 is configured to receive data from a satellite 404. Chromatic domain mapper 402 includes a controller 406, a memory 408, and a processor 410. In an embodiment, chromatic domain mapper 402 (e.g., controller 406) receives a true color reference image. Alternatively, in an embodiment, the reference image can be an image previously stored in memory, such as memory 404. In an embodiment, chromatic domain mapper 402 (e.g., controller 406) converts the reference image into colorspace.

In an embodiment, chromatic domain mapper 402 (e.g., controller 406) can receive image data from satellite 404 (e.g., a satellite orbiting the Earth configured to generate geospatial data). In an embodiment, this image data does not have enough information to generate a true color image (e.g., in an embodiment, the image data from satellite 404 lacks Y color band information). In an embodiment, chromatic domain mapper 402 (e.g., controller 406) estimates X and Z color bands from data supplied by satellite 404, uses the reference image data to establish a range of possible values for the target Y color band, and uses linear regression to solve for the Y color band. In an embodiment, after chromatic domain mapper 402 (e.g., controller 406) solves for the Y color band, chromatic domain mapper 402 (e.g., controller 406) can generate an RGB image based on the X, Y, Z values. Chromatic domain mapper 402 (e.g., controller 406) can then store this RGB image, output the RGB image to a user, and/or transfer the RGB image to another device (e.g., a server, an end-user device, etc.).

Elements of 3D chromatic domain mapper 402 can be implemented using hardware, software, and/or a combination of hardware and software in accordance with embodiments of the present disclosure. For example, in an embodiment, controller 406 is implemented using an algorithm executing on a host computer, and processor 410 and memory 408 are part of the hardware of the host computer. The host computer can be a general purpose computer or a special purpose computer for performing chromatic domain mapping. In an embodiment, chromatic domain mapper 402 is implemented as a special purpose device for performing chromatic domain mapping, and memory 408 and processor 410 are integrated into chromatic domain mapper 402. Elements of chromatic domain mapper 402 can be implemented using a single device or multiple devices in accordance with embodiments of the present disclosure.

4. Exemplary Methods

Figure 5:
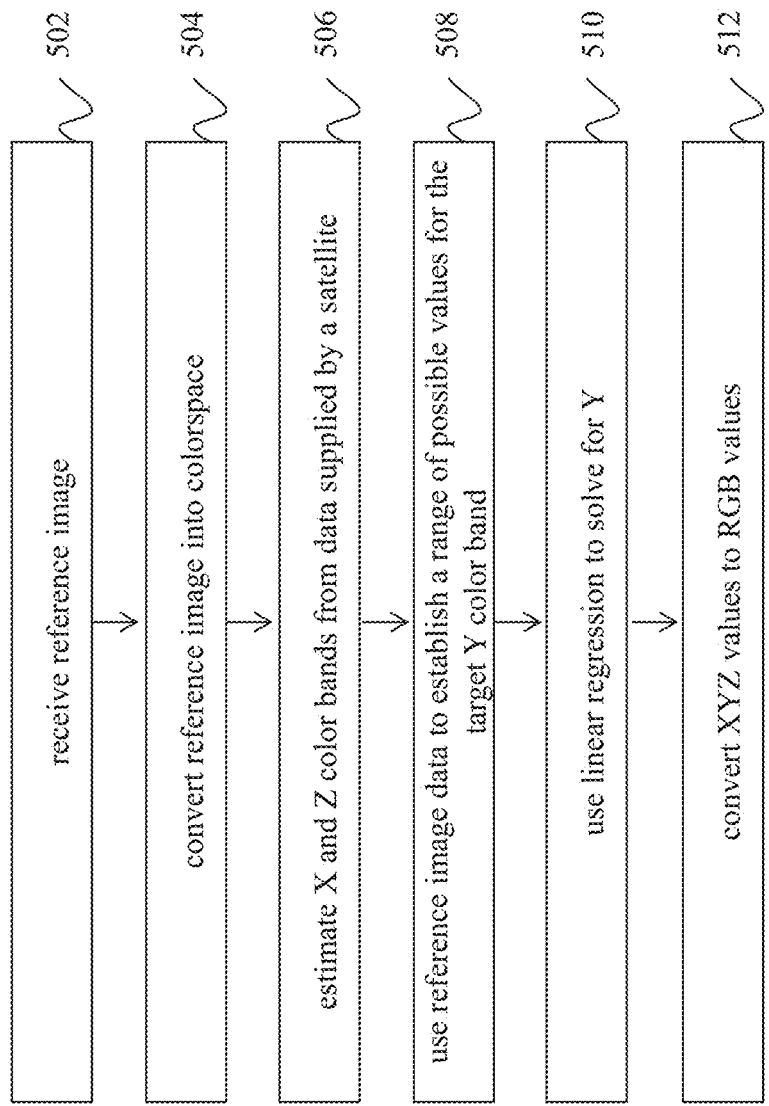
FIG. 5 is a flowchart of an exemplary method for chromatic domain mapping in accordance with an embodiment of the present disclosure.

FIG. 5 is a flowchart of an exemplary method for chromatic domain mapping in accordance with an embodiment of the present disclosure. In step 502, a reference image is received. For example, in an embodiment, a true color space reference image to be compared with more recent satellite data is received by chromatic domain mapper 402 (e.g., controller 406). In an embodiment, the reference image is already stored in memory, such as memory 408. In step 504, the reference image is converted into colorspace, such as the International Commission on Illumination (CIE) colorspace. In an embodiment, the reference image is reduced into tristimulus primaries X, Y, and Z. For example, in an embodiment, chromatic domain mapper 402 (e.g., controller 406) converts the reference image into colorspace. In an embodiment, normalized values can be used to reduce some atmospheric effects and intensity differences.

In an embodiment, the X, Y, and Z values can be plotted as ratios to eliminate brightness (e.g., magnitude) effects. In an embodiment, the Z/X ratio is broken into increments, and a minimum and maximum value of Y/X is defined for each increment. In an embodiment, within each increment, linear regression can be performed between X and Z (independent variables) and Y (dependent variable). In an embodiment, when the ratio increments (Z/X) are used to restrict the data, the tristimulus value relationships are much more linear. In an embodiment, the min/max values, increments, and regression statistics are retained from the reference image.

In step 506, X and Z color bands from data (e.g., image data) supplied by a satellite are estimated. In an embodiment, each pixel in the data from the satellite is examined for the estimated Z/X ratio. For example, in an embodiment, chromatic domain mapper 402 (e.g., controller 406) estimates X and Z color bands from the data supplied by satellite 404. In step 508, the reference image data is used to establish a range of possible values for the target Y color band. In an embodiment, the statistics from the reference image for the Z/X increment are used to estimate the Y tristimulus value. For example, in an embodiment, chromatic domain mapper 402 (e.g., controller 406) estimates the Y tristimulus value from the statistics from the reference image for the Z/X increment. In an embodiment, this is done by creating approximately 100 bins across the domain. In step 510, linear regression is used to solve for Y. For example, in an embodiment, chromatic domain mapper 402 (e.g., controller 406) uses linear regression to solve for Y. In step 512, the X, Y, Z values are converted to Red, Green, Blue (RGB) values to generate an image. For example, in an embodiment, chromatic domain mapper 402 (e.g., controller 406) generates an RGB image based on the X, Y, Z, values.

In an embodiment, there is no "geo-referencing" used in the method of FIG. 5, so color features can move and evolve in time. Further, in an embodiment, color discontinuities are also avoided. In an embodiment, the same color map can be used to color-enhance a much larger area from the geostationary view—beyond the reference image "swath" (~1250 km). In an embodiment, the method of FIG. 5 can be used to provide data every 5 minutes.

5. Further Detail on Chromatic Domain Mapping

Chromatic domain mapping in accordance with embodiments of the present disclosure will now be discussed in further detail. Embodiments of the present disclosure provide systems and methods to convolve ocean reflectance data obtained from contemporary ocean-viewing multispectral radiometers, such as Visible Infrared Imaging Radiometer Suite (VIIRS) and Ocean and Land Colour Instrument (OLCI) with spectrally-limited Advanced Baseline Imager (ABI) data obtained from the GOES-R meteorological satellites. Embodiments of the present disclosure employ a colorimetry approach to visible range ocean reflectance data.

In an embodiment, the true color space is used as a frame-of-reference that is mapped by the dedicated yet temporally sparse ocean color sensors. In an embodiment, coincident and spectrally coarse information from ABI is then used to estimate the evolution of the true color scene. In an embodiment, the procedure results in very high resolution (~5 min) true color image sequences.

Contemporary ocean-sensing radiometers (e.g., VIIRS and OLCI) are specifically engineered to detect the comparatively weak radiance signal emerging from the surface ocean. Most of these satellite-based sensors, however, are subject to the temporal constraint that a local area of ocean may be observed once per solar day (or perhaps less frequently due to orbital geometry). The presence of clouds may further render some ocean areas unobserved for days to weeks. Nonetheless, coverage is often sufficient to resolve the physical-biological interactions occurring within the oceanic mesoscale, that is, surface ocean circulation features on the spatial scale of tens to hundreds of kilometers across and persisting for several weeks to months. For example, the mesoscale eddies (large centers of cyclonic or anticyclonic ocean circulation) are often detected in satellite radiometer data, particularly near highly energetic western boundary currents.

Although the mesoscale remains an area of ongoing research, oceanographers are now devoting increasing attention to processes occurring on smaller space-time scales, a domain referred to as the "submesoscale." The submesoscale may be regarded as oceanic processes occurring on spatial scales of a few kilometers and smaller, and temporal scales of hours to a few days. Yet a critical aspect of the submesoscale paradigm is the dynamical ocean circulation: the submesoscale involves vertical movements of water several orders of magnitude more rapid than those typical of the larger mesoscale ocean circulation. Thus, these smaller scale movements may have a cumulatively large impact on global ocean processes, such as the biogeochemical cycling of elements.

In an embodiment, comprehensive observation of the ocean submesoscale from space requires sub-kilometer image resolution as well as a very high frequency data acquisition. In an embodiment, these requirements virtually mandate a geostationary or geosynchronous satellite orbit. The Geostationary Operational Environmental Satellite-R Series (GOES-R) meet these requirements, however, the Advanced Baseline Imager (ABI) sensor was not designed for ocean color applications. ABI lacks the visible spectral resolution (there are only two, broad visible bands centered at 470 and 640 nm) and the dynamic range and signal sensitivities that are typical of contemporary ocean color imagers. Nevertheless, in an embodiment, the GOES-ABI information may be repurposed to observe coastal ocean processes if the ABI visible band data are convolved with data obtained from dedicated ocean-viewing radiometers.

Embodiments of the present disclosure provide systems and methods for performing polar-orbiting-to-geostationary sensor data convolution and true color image estimation for GOES-R series ABI data that is specific to ocean color, i.e., the radiant signal emerging from the ocean's surface. In an embodiment, satellite data were obtained from three sensors: (1) the Ocean and Land Colour Imager (OLCI) on board the Sentinel-3A satellite; (2) the Visible Infrared Imaging Radiometer Suite (VIIRS) on the Suomi-National Polar-Orbiting Partnership (NPP) satellite; and (3) the Advanced Baseline Imager (ABI) on the Geostationary Operational Environmental Satellite (GOES)—R series (East).

5.1. True Color Reconstruction from Visible-Band Satellite Products

In an embodiment, for sensors (1) and (2) the Level 1 data were processed using the Naval Research Laboratory's (NRL's) Automated Optical Processing System (AOPS). The software system performs the appropriate atmospheric correction and produces Remotely-sensed reflectance (Rrs, sr$^{-1}$) at 300 m horizontal resolution (OLCI) and 750 m resolution (VIIRS). Rrs from 7 selected OLCI visible bands (412, 443, 490, 560, 665, 671, and 681 nm) and 5 VIIRS visible bands (412, 445, 488, 555, and 672 nm) were subjected to a band-centered, cubic spline interpolation procedure in order to construct an estimate of the hyperspectral Rrs signature ($\Delta\lambda$=1 nm, 400-700 nm) for each valid ocean pixel.

The AOPS processing conforms to standard NASA protocols, and the Rrs products are based on the normalized water-leaving radiances: Rrs=nLw/F$_0$, where F$_0$ is the mean extraterrestrial solar irradiance. Rrs (sr$^{-1}$) and nLw (mW cm$^{-2}$ um$^{-1}$ sr$^{-1}$) are the primary geophysical products used in ocean color remote sensing because their variance is presumed to be dominated by changes in the optical properties of the surface ocean that are, in turn, influenced by various biogeochemical processes. Rrs may be multiplied by $\pi$ to give the dimensionless water-leaving reflectance [$\rho_w$].

In an embodiment, where atmospheric (aerosol) correction proves difficult, [$\rho_w$] may be replaced by ["rho_s"; $\rho_s$], which is the estimated surface reflectance that has not been corrected for aerosol atmospheric contamination or aerosol-Rayleigh interactions. In an embodiment, this product is corrected for strictly Rayleigh contamination, atmospheric gas transmittances, and solar zenith angle; it is designated as quasi-surface reflectance in NASA product documentation.

In an embodiment, quantitative color reconstruction from these reflectance products [$\rho_w$, $\rho_s$] is based on the method described in Wernand et al. and is more generally the method used for standard colorimetric analysis of hyperspectral reflectance (or transmittance) data. This is a deliberate departure from much of the "true color" satellite imagery that appears in oceanographic literature and elsewhere. In many of these cases, three satellite radiometer channels are selected and arbitrarily scaled (to a range of 0-255) to construct a three-channel red-green-blue (RGB) color image. It is difficult to quantitively reproduce this color-rendering method because the scaling for each channel is deliberately arbitrary. Herein, the interpolated radiant spectra (from either remotely-sensed reflectance or quasi-surface reflectance) is integrated (via Reimann sum approximation) with the CIE 1931 standard color matching functions:

$$Xr = \int_{400}^{700} \rho_{w(s)}(\lambda) \, X_{CIE}(\lambda) \, D_{65}(\lambda) d\lambda \tag{1}$$

$$Yr = \int_{400}^{700} \rho_{w(s)}(\lambda) \, Y_{CIE}(\lambda) \, D_{65}(\lambda) d\lambda \tag{2}$$

$$Zr = \int_{400}^{700} \rho_{w(s)}(\lambda) \, Z_{CIE}(\lambda) \, D_{65}(\lambda) d\lambda \tag{3}$$

The subscript (r) indicates raw integrals (tristimulus values) across the CIE 1931 tristimulus functions (2° Field-of-View). The three tristimulus functions ($X_{CIE}$, $Y_{CIE}$, and $Z_{CIE}$) begin at 360 and extend to 780 nm, however, the functions are truncated herein (400-700 nm), and the bulk of the tristimulus function sensitivities are within this restricted spectral range. The D$_{65}$ term is the standard illuminant for daylight, outdoor conditions. Reflectance colorimetry computations are usually performed with a specified standard illuminant, such as D$_{65}$. Other choices are permissible so long as the tristimulus functions and illuminance standards are specified in the color computation and applied consistently. Taken together, the ocean color product and the colorimetry computation results in raw tristimulus values that would correspond to the color perception of an observer looking directly down into the water (no surface perturbation).

Unlike standard reflectance scenes familiar to photographers and other color science applications, the true water-leaving reflectance signal from the surface ocean is very small. For example, a typical ocean remote sensing $\rho_w$ value of ~0.003-0.01 is well below a standard middle grey value of 0.18 (middle grey is perceptually half way between black and white). That is why a spectrally uniform brightness standard (B$_{ref}$) in the brightness equation must be specifically designated for ocean remote sensing colorimetry applications:

$$Ys = \int_{400}^{700} B_{ref} Y_{CIE}(\lambda) D_{65}(\lambda) d\lambda \tag{4}$$

And $$X = \frac{Xr}{Ys}, Y = \frac{Yr}{Ys}, Z = \frac{Zr}{Ys} \tag{5}$$

The standard X, Y, and Z (red, green, and blue) tristimulus values may also be expressed in chromaticity coordinate space by defining the normalized x, y, and z chromaticity values:

$$x = \frac{X}{(X+Y+Z)}, y = \frac{Y}{(X+Y+Z)}, z = \frac{Z}{(X+Y+Z)} \tag{6}$$

Note that chromaticity coordinates do not depend on relative brightness (reflectance magnitude), but are instead dependent upon the shape of the radiant power distribution. In a typical chromaticity diagram, x and y are displayed, and z is omitted (since only x and y are required to identify a unique position in chromaticity space). However, for conversion to other color spaces wherein brightness is required, at least Y of the tristimulus primaries (X, Y, and Z; note chromaticity coordinates are by convention lower case x, y, and z) will be needed for additional computation. Chromaticity coordinates (CIE xyY) were converted to standard RGB for display as JPEG images following conventional color space conversion methods. In an embodiment, as long as the brightness reference is indicated, then (1) the color-rendering method is reproducible, and (2) the chromaticity of natural waters (x, y, and z coordinates) may be examined independently of the brightness standard selected.

An example of the results of the aforementioned true color reconstruction from OLCI reflectance data is shown in FIG. 1. The [$\rho_s$] product in top image 102 includes land and clouds, and these features are masked from the [$\rho_w$] product in bottom image 104. Despite the lack of a thorough atmospheric correction in top image 102, the ocean features of the two images have very similar color characteristics. This suggests that dominant color characteristics of marine waters may, in some cases, be estimated from reflectance data even where aerosol correction has not been performed.

5.2. GOES-ABI Processing

GOES-ABI (East) has two broad bands in the visible, one centered at 470 nm and one at 640 nm. The GOES ABI data for the study was retrieved from the Comprehensive Large Array-Data Stewardship System (CLASS) website (https://www.avl.class.noaa.gov/saa/products/welcome). Data selection parameters for the first 3 channels of the ABI L1B radiance datatype of GOES 16 for the CONUS extent were used to search for GOES data over the days of interest. The GOES Level 1B (L1B) data files were integrated and reformatted into one NRL systems-compliant L1B file to conform to the input format required by the AOPS program. The NRL-compliant L1B files were batch processed by AOPS to reproduce the "quasi-surface reflectance" product [$\rho_s$] at the 470 and 640 GOES-ABI bands. This allows for direct comparison to OLCI and VIIRS products without aerosol correction.

5.3. Chromatic Domain Mapping

Systems and methods using Chromatic Domain Mapping (CDM) in accordance with embodiments of the present disclosure can be used to quantify how the X, Y, and Z tristimulus primaries are related to one another in a reference color image and then use this information to determine the most likely estimator of one primary in a target image where that primary is corrupt, incomplete, or missing. This method is tractable for images based, primarily, on the ocean color signal, i.e., the water-leaving radiance ($L_w$). In an embodiment, this is because the spectral shape of the $L_w$ signal is largely a function of the spectral Inherent Optical Properties (IOPs) of the surface ocean. These variable IOPs, in turn, are due to the concentration of various optically-active substances in marine waters, e.g., chromophoric dissolved organic matter (CDOM), phytoplankton pigments, and suspended organic and inorganic particles. Whereas the relationships between the concentration of these constituents and their respective spectral optical properties is very complex, the spectral shapes of the resultant reflectance signals tend to vary in recurring patterns, a feature that has long been exploited in the development of ocean color inversion algorithms.

Figure 6:
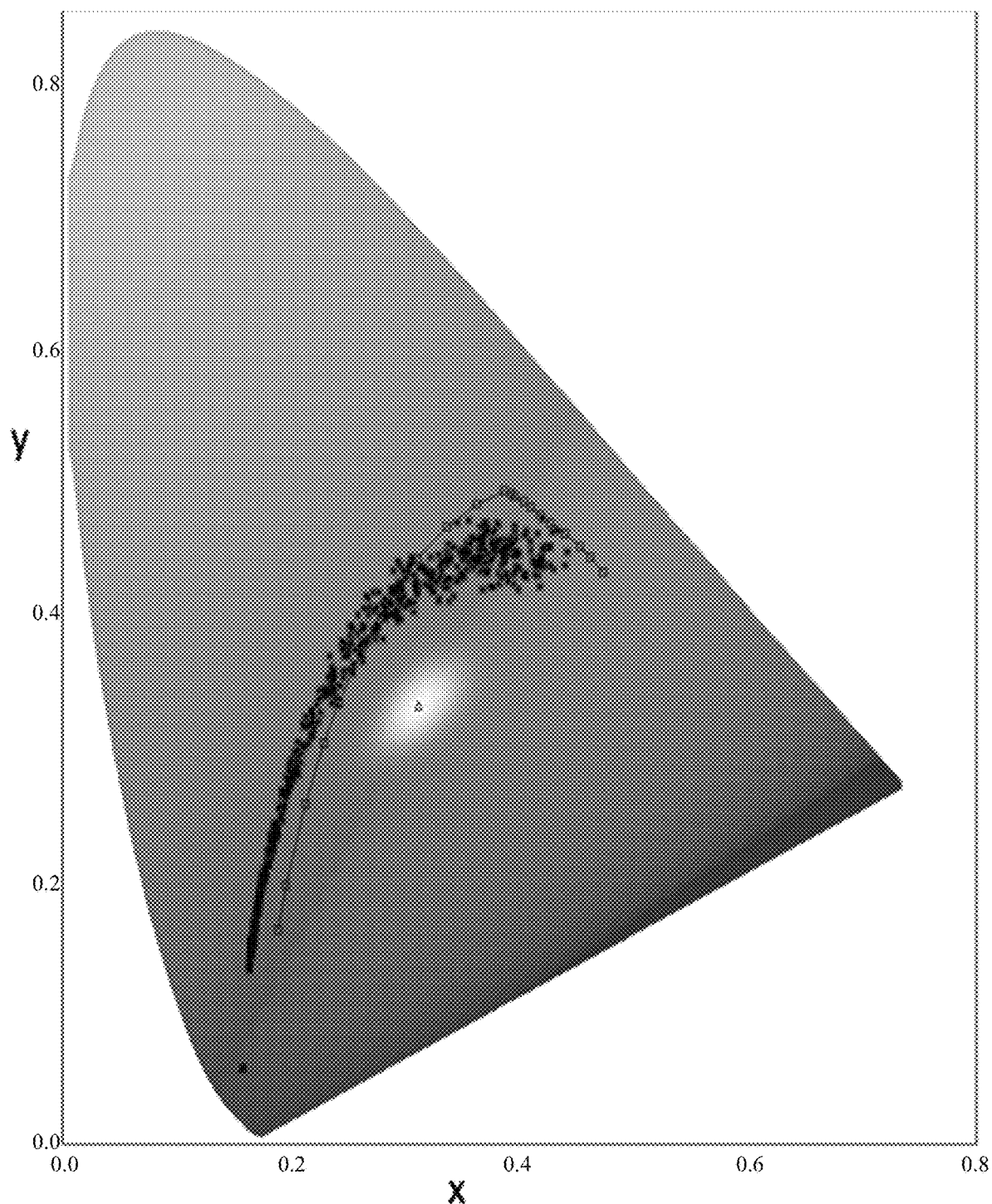
FIG. 6 is a chromaticity diagram in accordance with an embodiment of the present disclosure.

These spectral patterns for marine waters may be very succinctly summarized via colorimetric analysis. For example, the International Ocean Colour-Coordinating Group (IOCCG) has established 500 reference Rrs spectra that are representative of marine waters. These spectra were used in Equations (1)-(6) ($\rho_w$=Rrs $\pi$). The results displayed in chromaticity coordinate space in FIG. 6. FIG. 6 is a chromaticity diagram in accordance with an embodiment of the present disclosure. FIG. 6 shows the IOCCG reference spectra (n=500) in chromaticity space (*). The squares and line are the FU scale color reconstructions from Wernand et al.

A reference point based on the IOPs of pure seawater and a simplified computation of the resultant Rrs hyperspectral signal is shown in FIG. 1 as well. Pure seawater (far lower left) and very clear ocean waters occupy the lower left domain of the chromaticity diagram (small x and y values, indicating a dominance of blue light, z). Generally, increasing water turbidity follows a characteristic arc, first increasing predominantly along the y axis (increasing relative amount of green light) and then increasing more along the x axis (increasing relative amount of red light). The term "turbidity" is used here simply to refer to an overall increase in absorbing and scattering optical constituents for marine waters. Also shown in the diagram are the Forel-Ule (FU) color comparator scale chromaticity coordinates, as given in Wernand et al. These FU values follow a similar trend, increasing first in y then in x coordinates with increasing turbidity; there is even an inflection towards diminishing y values at the right-side end of the FU spectrum.

In an embodiment, hyperspectral signals from marine waters occupy very specific regions of chromaticity space, and once the location is estimated for a given sample, other properties may then be inferred. For the GOES-ABI data, it is presumed that the 470 band is a suitable estimator of the blue primary, Z, and the 470 band and 640 bands are (combined) likewise estimators of the red primary, X (the red CIE 1931 tristimulus function includes some sensitivity in the blue spectral region). The Y primary is missing; GOES-ABI does not have a green band. The problem posed: given an estimate of X and Z, what is the most likely estimate of Y? To initially remove variations due to changes in brightness (signal magnitude), it can be prudent to first examine the behavior of a reference color image in chromaticity space. However, in an embodiment, since the Y primary is unknown, we reduce the problem further to examine the relationship between simple tristimulus value ratios.

For example, in an embodiment, the OLCI color image data in FIG. 1 (top image 102, based on $\rho_s$) is shown in FIG. 2 to demonstrate the quasi-linear relationship between the X/Z ratio (a quantity that may be estimated from GOES-ABI data) and Y/Z ratio (the unknown). This reference relationship can be exploited by defining the minimum and maximum values of Y for a given value of Z and X. In FIG. 2, in an embodiment, the ratio X/Z, rather than the absolute X and Z values, is initially critical because this ratio narrows the possible chromatic domain down to a restricted range of optical water types. Recall the chromaticity diagram (FIG. 6) for the reference spectra: clear waters are blue light dominant, and very turbid waters are red light dominant. Similarly, The X/Z ratio can be conceptualized as a bulk indicator of water turbidity ranging from clear marine waters (low red to blue primary ratio) to more turbid (higher red to blue primary ratio).

In an embodiment, to determine the absolute magnitude of Y in the target image that is within the minimum and maximum bounds established by the reference image, we then examine the linear relationships between X (or Z) and Y over a very restricted range of X/Z values. For example, there is significant scatter and divergence when all Y versus Z values are plotted in the reference image (r2=0.46; FIG. 2 bottom image 204). Over a restricted range of X/Z values, however, there is a much more linear relationship (r2=0.99) that will conform to simple linear regression techniques In an embodiment, chromatic domain mapping is the process of quantifying these relationships in the reference image and then determining the most likely missing or corrupt primary in the target image. In theory, these relationships could be established from reference Rrs spectra for marine waters. However, we have not yet established a consistent method to remove aerosol contamination from GOES-ABI blue and red band data. Thus, the reference image is the non-aerosol corrected surface reflectance product, with land and clouds (as much as possible) eliminated from the reference image for the CDM application.

Figure 7:
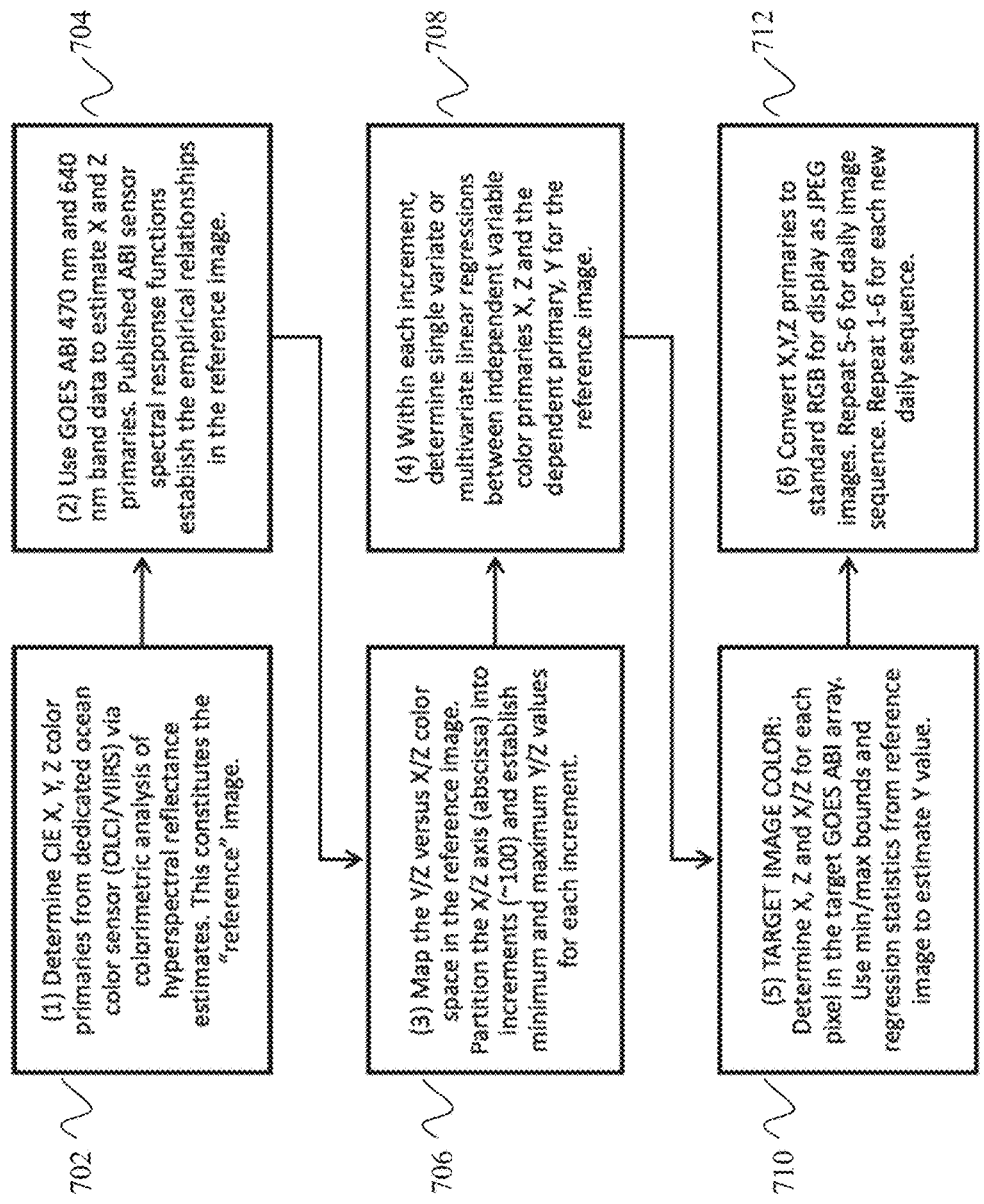
FIG. 7 is another flowchart of an exemplary method for chromatic domain mapping in accordance with an embodiment of the present disclosure.

FIG. 7 is another flowchart of an exemplary method for chromatic domain mapping in accordance with an embodiment of the present disclosure. In an embodiment, FIG. 7 shows a flow diagram of the CDM procedure for the specific application of convolving OLCI or VIIRS data to the GOES-R ABI image sequences. In step 1 702, the CIE X, Y, Z color primaries from dedicated ocean color sensors via colorimetric analysis are determined. The colorimetry analysis of ocean color sensor reflectance, is described in detail in the preceding section and Equations (1)-(6).

Figure 8:
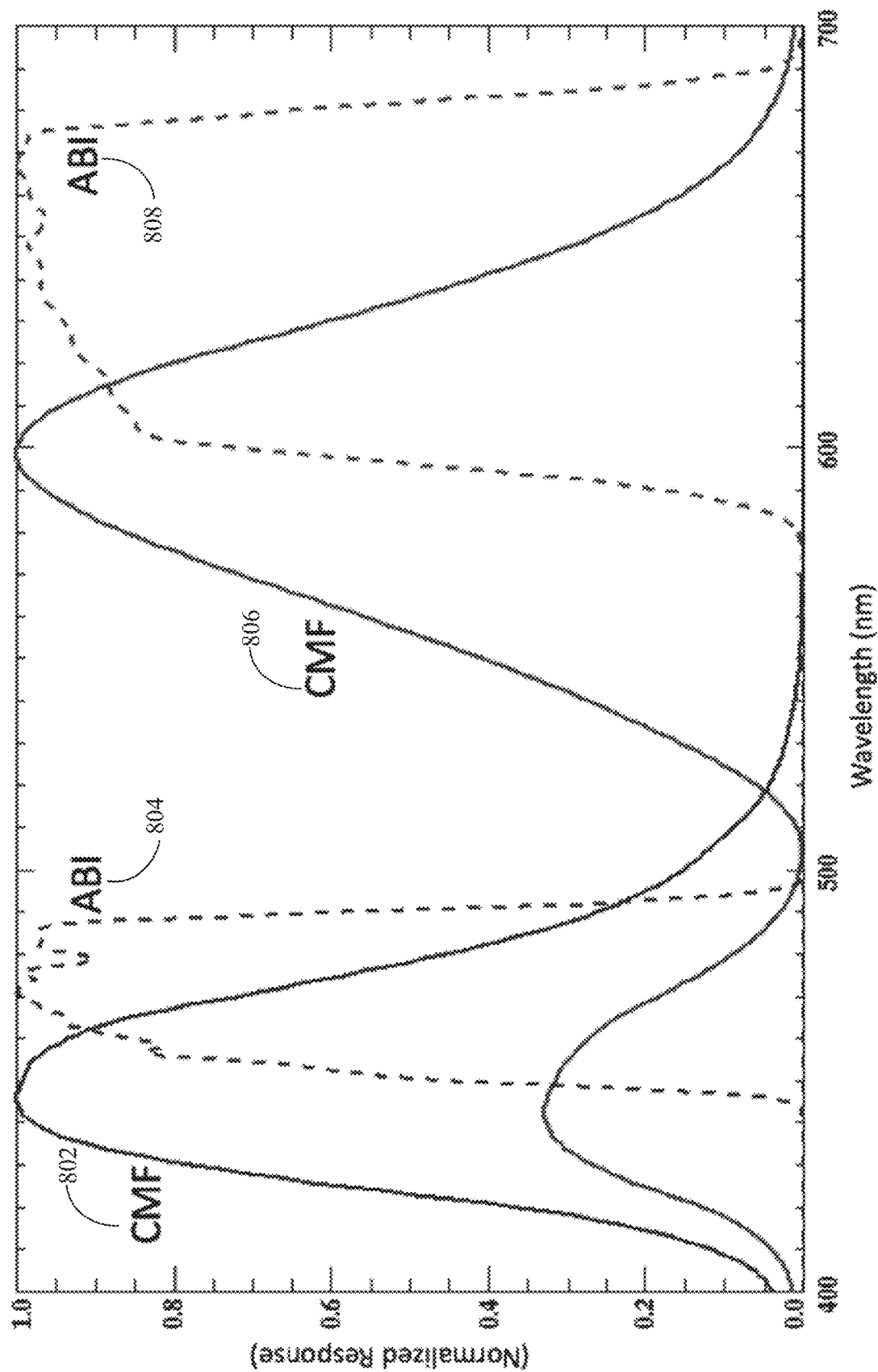
FIG. 8 is a diagram showing color matching functions and GOES-ABI spectral response functions in accordance with an embodiment of the present disclosure.

In step 2 704, X and Z primaries are estimated. It is important to clarify that although GOES-ABI only has two bands in the visible, these bands are very broad and thus the ABI spectral response covers significant portions of the visible. These features make the ABI well-suited to estimate red and blue color primaries (X and Z) since the color matching functions are also very broad (as shown in FIG. 8). In an embodiment, when estimating color properties from satellite visible band data, one must not only consider the total number of bands in the visible range but also the spectral shape (band width) of the spectral response functions.

In the same manner that a hyperspectral reconstruction from multispectral (narrow band) sensor data can be integrated with the color matching functions, these hyperspectral reflectances can also be integrated with the ABI spectral response functions (as shown in FIG. 8). FIG. 8 is a diagram showing color matching functions and GOES-ABI spectral response functions in accordance with an embodiment of the present disclosure. Element 802 of FIG. 8 shows the blue color matching function (CMF), and element 806 shows the red CMF. Element 804 shows the blue GOES-ABI spectral response function, and element 808 shows the red GOES-ABI spectral response function. In an embodiment, there is sufficient overlap between color matching functions (for X and Z) and GOES ABI spectral responses that linear relationships between them may be determined for a reference image.

In an embodiment, once the X and Z values are estimated, the remaining task is to estimate the missing Y value, and this is done using the X, Y, and Z primary relationships established in the reference image. In step 3 706, the Y/Z versus X/Z color space is mapped in the reference image, the X/Z axis is partitioned into increments, and minimum and maximum Y/Z values are established for each increment. In an embodiment, 100 increments were initially applied to the reference X/Z ratio values, as this resulted in at least ~100 pixels within each increment given an OLCI swath width of 1270 km, a selected scene (granule) height of comparable distance, and a pixel resolution of 300 m. In an embodiment, more increments will reduce the number of pixels, and we presumed that below ~30 (based strictly on a common statistical rule-of-thumb estimate) the regressions would become less accurate. Introducing fewer X/Z increments (and larger sample sizes), however, will cause the primary relationships within each increment become less linear (as shown in FIG. 2, bottom image 204). Hence, in an embodiment, there is an inherent compromise to be made between sample size and linearity. Further refinement of the method will determine a more robust method of total increment partition. Within each increment, the minimum and maximum Y/Z values are simply determined by the total range of pixels in that increment.

In step 4 708, single variate or multivariate linear regressions between independent variable color primaries X, Z and the dependent primary Y are determined within each increment for the reference image. In an embodiment, if a spurious pixel with an abnormally high or low Y/Z value is present, this range will not be accurate and the linear regressions may be unduly biased. Thus, some manual quality control can be required when establishing the reference pixels (FIG. 2, top image 202).

In step 5 710, X, Z and X/Z are determined for each pixel in the target GOES ABI array, and min/max bounds and regression statistics are used from the reference image to estimate the Y value. In step 6 712, the X, Y, Z primaries are converted to standard RGB for display as images, such as Joint Photographic Experts Group (JPEG or JPG) images. In an embodiment, step 5 710 and step 6 712 can be repeated for daily image sequences, and steps 1-6 702-712 can be repeated for each new daily sequence.

In an embodiment, step 5 710 and step 6 712 are the rendering processes for converting the GOES ABI data into color image sequences. Due to the aerosol contamination that remains in the reference image at this time (and until GOES ABI data are aerosol corrected), it is recommended that the reference image from OLCI or VIIRS be in close in time and space as possible to the GOES ABI image sequence.

In an embodiment, the X/Z ratio determination narrows the likely optical water type along a spectrum from turbid (higher X/Z ratios) to very clear (lower X/Z ratios). In an embodiment, once this restriction of the data occurs, then (1) the range of possible Y values is restricted, and (2) relationships between X, Y, and Z primaries are much more amenable to simple linear statistics, and the true color reconstruction maintains fidelity to the reference color image.

6. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A chromatic domain mapper, comprising:
   a memory storing reference image data; and
   a controller configured to:
      receive image data from a satellite orbiting the Earth;
      determine a reference X component, a reference Y component, and a reference Z component based on the reference image data;
      estimate a satellite X component and a satellite Z component from the image data received from the satellite;
      determine a range of possible values for a satellite Y component based on the reference image data;
      determine the satellite Y component based on the range of possible values for the satellite Y component; and
      generate a red, green, blue (RGB) image based on the satellite X component, the satellite Z component, and the determined satellite Y component.

2. The chromatic domain mapper of claim 1, wherein the reference image is a true color space reference image.

3. The chromatic domain mapper of claim 1, wherein the reference X component, the reference Y component, and the reference Z component are components of X, Y, Z International Commission on Illumination (CIE) colorspace.

4. The chromatic domain mapper of claim 1, wherein the controller is further configured to:
   determine a plurality of increments of a first ratio between the reference Z component and the reference X component; and
   determine a minimum value of a second ratio between the reference Y component and the reference X component for each increment in the plurality of increments.

5. The chromatic domain mapper of claim 4, wherein the controller is further configured to:
   perform linear regression between the reference X component, the reference Z component, and the reference Y component, thereby generating linear regression statistics.

6. The chromatic domain mapper of claim 5, wherein the controller is further configured to:
   determine the satellite Y component based on the linear regression statistics.

7. A method for chromatic domain mapping, the method comprising:
   receiving, using a processing device, image data from a satellite orbiting the Earth;
   determining, using the processing device, a reference X component, a reference Y component, and a reference Z component based on reference image data;
   estimating, using the processing device, a satellite X component and a satellite Z component from the image data received from the satellite;
   determining, using the processing device, a range of possible values for a satellite Y component based on the reference image data;
   determining, using the processing device, the satellite Y component based on the range of possible values for the satellite Y component; and
   generating, using the processing device, a red, green, blue (RGB) image based on the satellite X component, the satellite Z component, and the determined satellite Y component.

8. The method of claim 7, wherein the reference image is a true color space reference image.

9. The method of claim 7, wherein the reference X component, the reference Y component, and the reference Z component are components of X, Y, Z International Commission on Illumination (CIE) colorspace.

10. The method of claim 7, further comprising:
    determining a plurality of increments of a first ratio between the reference Z component and the reference X component; and
    determining a minimum value of a second ratio between the reference Y component and the reference X component for each increment in the plurality of increments.

11. The method of claim 10, further comprising:
    performing linear regression between the reference X component, the reference Z component, and the reference Y component, thereby generating linear regression statistics.

12. The method of claim 11, wherein determining the satellite Y component further comprises:
    determining the satellite Y component based on the linear regression statistics.

13. A method for chromatic domain mapping, the method comprising:
    receiving, using a processing device, image data from a satellite orbiting the Earth;
    determining, using the processing device, a reference X component, a reference Y component, and a reference Z component based on reference image data;
    estimating, using the processing device, a satellite X component, and a satellite Z component from the image data received from the satellite;
    determining, using the processing device, a map between a first ratio of the reference Y component to the reference Z component and a second ratio of the reference X component to the reference Z component;
    partitioning, using the processing device, an X/Z axis of the map into a plurality of increments;
    determining, using the processing device, respective minimum values and maximum values for each increment in the plurality of increments;

determining, using the processing device, respective linear regressions between the reference X component and the reference Z component and the reference Y component within each increment, thereby generating linear regression statistics;

estimating, using the processing device, the satellite Y component based on the minimum values, the maximum values, and the linear regression statistics; and generating, using the processing device, a red, green, blue (RGB) image based on the satellite X component, the satellite Z component, and the estimated satellite Y component.

14. The method of claim 13, wherein the plurality of increments comprise 100 increments.

15. The method of claim 13, wherein the linear regressions are single variate linear regressions.

16. The method of claim 13, wherein the linear regressions are multivariate linear regressions.

17. The method of claim 13, further comprising:
determining a respective satellite X component, a respective satellite Z component, and a respective satellite X/Z ratio for each pixel in the image data from the satellite.

18. The method of claim 13, wherein the RGB image is a Joint Photographic Experts Group image.

19. The method of claim 13, further comprising:
receiving updated image data from the satellite; and
estimating an updated satellite Y component based on the minimum values, the maximum values, and the linear regression statistics.

20. The method of claim 19, further comprising:
generating a second red, green, blue (RGB) image based on an updated satellite X component, an updated satellite Z component, and estimated updated satellite Y component.

* * * * *